United States Patent Office 2,735,081
Patented Feb. 14, 1956

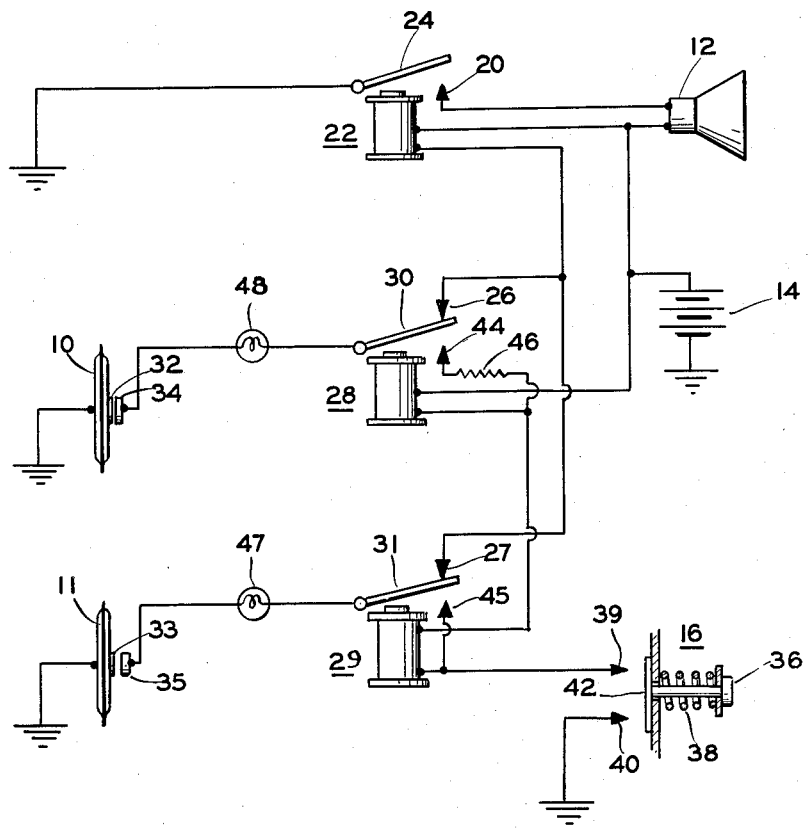

2,735,081
ALTITUDE WARNING SYSTEM

Norman F. Hosford, Towaco, N. J., assignor to Bendix Aviation Corporation, Teterboro, N. J., a corporation of Delaware Application October 31, 1949, Serial No. 124,671

3 Claims. (Cl. 340—27)

The present invention relates generally to indicating or warning systems and more particularly to a system for producing an indication when either of two predetermined conditions is reached.

In certain types of aircraft, it is essential that the occupants thereof unfailingly be notified when to start using oxygen breathing equipment and when to adjust the equipment to start breathing pure oxygen. The main objections to warning devices heretofore used is that they have to be reactivated after each time that they have been tripped, so that if the craft descends below the critical altitude and again rises above such altitude the warning devices will not again operate without being manually reactivated.

The present invention contemplates the provision of novel means in an altitude warning system whereby the warning signal may be suppressed after having served its purpose without thereby affecting the subsequent operation of the system.

Accordingly, one object of the present invention is to provide a novel warning system for indicating when either of two conditions is reached including means for suppressing the warning indication without affecting the subsequent operation of the system.

Another object of the invention is to provide novel, simple and effective means in an aircraft for indicating to the occupants thereof when they should start using oxygen breathing apparatus and when they should adjust the regulating valve thereof to supply pure oxygen.

Another object is to provide novel and simple means in an indicating system for producing an indication when either of two predetermined conditions is attained for suppressing such indication without affecting subsequent operation of the system.

Still another object of the present invention is to provide a novel and simple automatic altitude warning system for aircraft which will give an indication when either of a plurality of altitudes is attained including provision for extinguishing the indication after having been observed without in any manner affecting the subsequent operation of the system.

The foregoing and other objects and advantages of the invention will appear more fully hereinafter from a consideration of the detailed description which follows, taken together with the accompanying drawing wherein one embodiment of the invention is illustrated by way of example. It is to be expressly understood, however, that the drawing is for purpose of illustration and description only, and is not intended as a definition of the limits of the invention.

The single figure of the drawing illustrates one embodiment of the present invention as applied to an aircraft warning system.

The system described herein is adapted to give a warning signal to the occupants of an aircraft when an altitude is attained at which they should start using the oxygen equipment and another warning signal when they should adjust the control valve thereof to supply pure oxygen. In aircraft using unpressurized cabins, the first warning signal should be given when an altitude of approximately 10,000 feet is attained and the second signal when an altitude of approximately 40,000 feet is attained. The warning signal may be a flashing light, but it is preferable to use an audible signal such as a loud horn or a combination of the two in order to insure the attention of the occupants.

For a better understanding of the present invention, reference is had to the drawing wherein pressure responsive devices or aneroids 10 and 11 are connected in a circuit for sounding a warning device such as horn 12 when the ambient pressure is reduced to either of two predetermined values.

Horn 12 is shown as having its energizing winding connected on one side to a source of electric potential such as a storage battery 14 and on the other side to contact 20 of relay 22, so that the horn will be energized when the relay is actuated causing grounded contact arm 24 to move against contact 20. The actuating winding of relay 22 is connected on one side to battery 14 and on the other side to back contacts 26 and 27 of relays 28 and 29, respectively.

Aneroid 10 carries a contact 32 adapted to be moved into engagement with stationary contact 34 upon a predetermined expansion of the aneroid, and similarly aneroid 11 carries a contact 33 adapted to be moved into engagement with stationary contact 35. Contact 34 is connected to armature 30 of relay 28 and contact 35 is connected to armature 31 of relay 29. Armatures 30 and 31 are normally in engagement with back contacts 26 and 27 of relays 28 and 29, respectively.

The spacing between contacts 32 and 34 is adjusted so as to engage due to expansion of aneroid 10 at an ambient pressure corresponding to atmospheric pressure at the altitude at which it is desired to get a warning signal to don the gas mask or to energize the oxygen equipment, usually at 10,000 feet. Similarly contacts 33 and 35 are spaced so as to make contact at approximately 40,500 feet when it is necessary to breathe 100% oxygen. If the aneroids are exposed to atmospheric pressure and the cabin is pressurized, the altitude at which the contacts close may be increased by an amount corresponding to the degree of pressurization.

When contacts 32 and 34 engage, a circuit is established from battery 14 through energizing winding of relay 22, back contact 26, armature 30 to ground causing grounded armature 24 of relay 22 to move against contact 20 and sound horn 12, and similarly when contacts 33 and 35 engage, the energizing circuit is established through back contact 27 and armature 31.

In order to deenergize the horn after it has been sounded a suppressor circuit including a push button switch 16 is provided.

By momentarily depressing button 36 of switch 16 against the bias of return spring 38, contacts 39 and 40 will be short circuited by metal bar 42 and will establish a circuit from battery 14 through the series connected energizing windings of relays 28 and 29 to ground thereby causing contact arms 30 and 31 actuated thereby to move away from back contacts 26 and 27 and engage front contacts 44 and 45, respectively. This will interrupt the circuit through the energizing winding of relay 22 and the arm 24 will move away from contact 20, thus deenergizing horn 12. It will be noted that when contacts 32 and 34 associated with aneroid 10 are closed, momentary closing of switch 16 will cause relay 28 to remain energized through the holding circuit which can be traced from battery 14, energizing winding of relay 28, current limiting resistor 46, contact 44, arm 30, closed contacts 32, 34 to ground. Relay 29, however, will return to operating position as shown upon release of switch 16. If switch 16 is momentarily closed while contacts 33 and 35 are in engagement, relay 29 will be energized causing arm 31 to move against contact 45 to establish a holding circuit for the relay from battery 14, through the energizing windings of relays 28 and 29, contact 45, contact arm 31, closed contacts 33, 35 to ground. The value of resistor 46 is chosen so as to permit sufficient current to flow therethrough to hold relay 28 when contacts 32, 34 are closed, but not sufficient to by-pass the energizing winding of relay 29 when both sets of contacts 32, 34 and 33, 35 are closed.

By selecting aneroids 10 and 11 of different sensitivity or by spacing the contacts 33, 35 further apart than contacts 32, 34, the latter contacts may be made to close at 10,000 feet and the former to close at 40,000 feet. While the aircraft equipped with the novel warning system described herein is flying at altitudes less than 10,000 feet, the parts of the system will be in the position shown in the drawing. When the predetermined altitude is reached at which the occupants should start using the oxygen equipment, aneroid 10 will have expanded to a point where contact 32 is moved into engagement with contact 34 thereby actuating relay 22 to energize horn 12.

To silence the warning device, the pilot momentarily depresses button 36 of switch 16 whereby relays 28 and 29 are actuated to move armatures 30, 31 to break the connection thereof with contacts 26, 27, respectively, and establish connection with contacts 44 and 45, respectively. This will deenergize relay 22 and silence the warning device. When button 36 is released, armature 31 of relay 29 will return into engagement with contact 27 while relay 28 will remain closed due to the holding action previously pointed out. If the craft should descend below the level at which the use of oxygen equipment is needed, aneroid 10 will contract until contacts 32 and 34 separate and interrupt the holding circuit for relay 28 permitting armature 30 to return to initial position against contact 26. The system is again ready to sound the warning device if the craft should return to the level at which it is again necessary to use oxygen equipment.

If the craft continues to gain altitude after aneroid 10 has sounded the horn which subsequently has been silenced by actuation of switch 16 whereby contact arm 30 remains in engagement with contact 44, aneroid 11 will move contact 33 into engagement with contact 35 when a predetermined altitude is reached at which it is necessary to breathe pure oxygen, usually at 40,000 feet. This will actuate relay 22 to sound the horn which may be silenced by again momentarily closing switch 16 whereupon both armatures 30 and 31 will stay closed as long as the craft remains above the second altitude level. Momentary drop below the secondary altitude level will deenergize relay 29 which then will again be in position to sound the horn if the craft should again ascend above this level. Thus the system described automatically resets itself for the different altitude levels. It will be apparent that the system described above may be modified to indicate additional altitude levels by providing additional stages of altitude sensitive devices with associated relays.

In order to indicate within which altitude zone the craft is at any time the filament of a glow lamp may be connected in series with contacts 34 and 35, respectively, as indicated at 43 and 47 so as to glow as long as current is flowing through closed contacts 32, 34 and 33, 35, respectively. Such indication may also be provided by placing additional armatures on relays 28 and 29 to energize separate indicating circuits as long as the respective armatures remain in closed position.

It will be apparent to those skilled in the art that the circuit described herein may be used for a variety of purposes and may be modified to indicate a variety of conditions. Thus by making aneroids 10 and 11 sensitive to aircraft speed by connecting the dynamic pressure from a Pitot tube, for instance, to the interior thereof and exposing them to the static pressure, the system may be adapted to indicate different speed limits.

Although only one embodiment of the invention has been illustrated and described in detail, it is to be expressly understood that the invention is not limited thereto. Various changes can be made in the design and arrangement of the parts without departing from the spirit and scope of the invention as the same will now be understood by those skilled in the art.

I claim:

1. An altitude warning system for aircraft for producing a warning signal when either of two predetermined altitudes is reached and for suppressing said warning signal without thereby inactivating the system, comprising a warning device, two independent circuits for energizing said warning device, each circuit being connected to a source of electric power and having a normally open switch and a normally closed switch connected in series therewith, an altitude responsive device associated with each of said circuits and each altitude responsive device being adapted to close said normally open switch when the craft reaches one of said predetermined altitudes, and one relay associated with each of said normally closed switches and adapted to open its related switch when energized, said relays having serially connected exciting windings connected to a source of electric power and including a common switch for momentarily energizing said windings, each of said relays having a holding circuit including one of said normally open switches so as to remain in actuated position if energized when said common switch momentarily energizes said windings.

2. A system for indicating when either of two predetermined conditions is reached and for suppressing said indication, comprising indicating means, at least two independent circuits for energizing said indicating means, each circuit being connected to a source of electric power and having a normally open switch and a normally closed switch connected in series therewith, a condition responsive device associated with each of said circuits, each condition responsive device being adapted to close its associated and normally open switch when one of said predetermined conditions is reached, and a relay associated with each of said normally closed switches and adapted to open its related switch when energized, said relays having serially connected exciting windings connected to a source of electric power and including a common switch for momentarily energizing said windings, each of said relays having a holding circuit including one of said normally open switches so as to remain in actuated position if energized when said common switch momentarily energizes said windings.

3. A system for producing a warning signal when either one of two different altitudes is reached comprising a warning device, a relay for actuating said device, an exciting winding for said relay, a pair of altitude sensitive devices, each of the last named devices including a switch connected in series with said exciting winding and each being adapted to close the switch associated therewith to energize said relay and actuate said warning device at a predetermined altitude, and a suppressing circuit for said warning device comprising a pair of suppressing relays having series connected exciting windings adapted to be momentarily energized, each suppressing relay having an armature connected through the switch of one of said altitude sensitive devices, said armatures being adapted to open the circuit through their respective switches when actuated, and a contact connected to the exciting winding of each suppressing relay, each contact being associated with one of said armatures and engaged thereby upon actuation of the latter to establish a holding circuit for the respective suppressing relays when the series connected exciting windings of said suppressing relays are momentarily energized.

References Cited in the file of this patent

UNITED STATES PATENTS

| | | |
|---|---|---|
| 2,127,343 | Parlett | Aug. 16, 1938 |
| 2,275,883 | Bany | Mar. 10, 1942 |
| 2,439,474 | Kennelly | Apr. 13, 1948 |
| 2,447,625 | Astin | Aug. 24, 1948 |
| 2,461,075 | Naylor | Feb. 8, 1949 |
| 2,602,111 | Baker | July 1, 1952 |

FOREIGN PATENTS

| | | |
|---|---|---|
| 601,058 | Great Britain | Apr. 27, 1948 |